United States Patent
Eggleston et al.

(10) Patent No.: US 10,931,752 B2
(45) Date of Patent: *Feb. 23, 2021

(54) RESOURCE MANAGEMENT IN A DISTRIBUTED SYSTEM

(71) Applicant: DataStax, Inc., Santa Clara, CA (US)

(72) Inventors: Blake David Eggleston, Sherman Oaks, CA (US); Anthony Edward Cozzie, Estes Park, CO (US)

(73) Assignee: DataStax, Inc., Santa Clara, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/143,218

(22) Filed: Sep. 26, 2018

(65) Prior Publication Data

US 2019/0028540 A1    Jan. 24, 2019

Related U.S. Application Data

(63) Continuation of application No. 15/194,446, filed on Jun. 27, 2016, now Pat. No. 10,148,754.

(51) Int. Cl.
*G06F 15/173* (2006.01)
*H04L 29/08* (2006.01)
*H04L 29/06* (2006.01)

(52) U.S. Cl.
CPC ...... *H04L 67/1095* (2013.01); *H04L 67/1097* (2013.01); *H04L 67/42* (2013.01); *H04L 69/28* (2013.01)

(58) Field of Classification Search
CPC .......................... H04L 67/1095; H04L 69/28
See application file for complete search history.

(56) References Cited

U.S. PATENT DOCUMENTS

| | | | | |
|---|---|---|---|---|
| 6,658,417 B1 * | 12/2003 | Stakutis | .................. | G06F 16/10 |
| 2002/0147611 A1 * | 10/2002 | Greene | .......... | G06Q 10/063112 |
| | | | | 705/1.1 |
| 2002/0165727 A1 * | 11/2002 | Greene | ................ | H04L 63/102 |
| | | | | 705/1.1 |

OTHER PUBLICATIONS

United States Office Action, U.S. Appl. No. 15/194,446, dated Apr. 18, 2018, 10 pages.

* cited by examiner

*Primary Examiner* — Hua Fan
(74) *Attorney, Agent, or Firm* — Fenwick & West LLP

(57) ABSTRACT

A distributed system that manages resources of the distributed system without the need for complex time synchronization systems is described. The distributed system includes a resource manager that manages the resources of the distributed system. The resource manager assigns leases and renews leases of resources of the distributed system to clients in the distributed system. The leases specify the duration of time that the lease is awarded to clients.

20 Claims, 5 Drawing Sheets

RESOURCE MANAGEMENT IN A DISTRIBUTED SYSTEM

CROSS-REFERENCE TO RELATED APPLICATIONS

This application is a continuation of U.S. patent application Ser. No. 15/194,446 filed on Jun. 27, 2016 which is incorporated by reference in its entirety.

TECHNICAL FIELD

The embodiments disclosed herein generally relate to distributed systems and more particularly to resource management in distributed systems.

BACKGROUND

In a distributed system such as a data center, the distributed system may include a coordinator that is responsible for managing the resources of the distributed system. It is often convenient for the conventional distributed system to include a synchronization mechanism to allow the synchronization of the state of resources managed by the coordinator. For example, the coordinator assigns leases of resources to clients in the distributed system where a lease grants a client responsibility for a resource for a limited period of time. It is important for the coordinator and the client to be synchronized regarding the time period that the client holds the lease for the resource. Conventional distributed systems may rely on sophisticated time synchronization systems, such as atomic clocks, or check and set operations to determine when a lease assigned to a client expires. However, the time synchronization systems required in conventional distribution systems increase the complexity of the distributed systems. Furthermore, clock skew between the coordinator, clients, and lessees in the distributed system as well as network latency increase the difficulty in managing the resources in the distributed system.

SUMMARY

The embodiments herein describe a distributed system that manages resources of the distributed system without the need for complex time synchronization systems or expensive check and set operations for every client query. In one embodiment, the distributed system includes a resource manager that manages the resources of the distributed system. The resource manager assigns leases and renews leases of resources of the distributed system to clients in the distributed system.

A client that receives a lease on a resource is considered a lessee of the resource. As a lessee of a resource, the lessee is responsible for the resource and fulfills requests from clients to access the resource while the lease for the resource is valid. In one embodiment, the lease on the resource specifies a duration of time that the lessee is granted the lease to the resource rather than a specific time when the lease expires. By specifying the duration of time that the lease is valid rather than a specific expiration time of the lease, the lessee and the resource manager can each track the duration of time according to their respective internal clocks. By having the resource manager and the lessee each track the duration of time of the lease according to their respective internal clocks, a complex time synchronization system is not required thereby simplifying the system and bypassing any issues caused by clock skew or network latency in the distributed system.

The features and advantages described in this summary and the following detailed description are not all inclusive. Many additional features and advantages will be apparent to one of ordinary skill in the art in view of the drawings, specification and claims.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1:
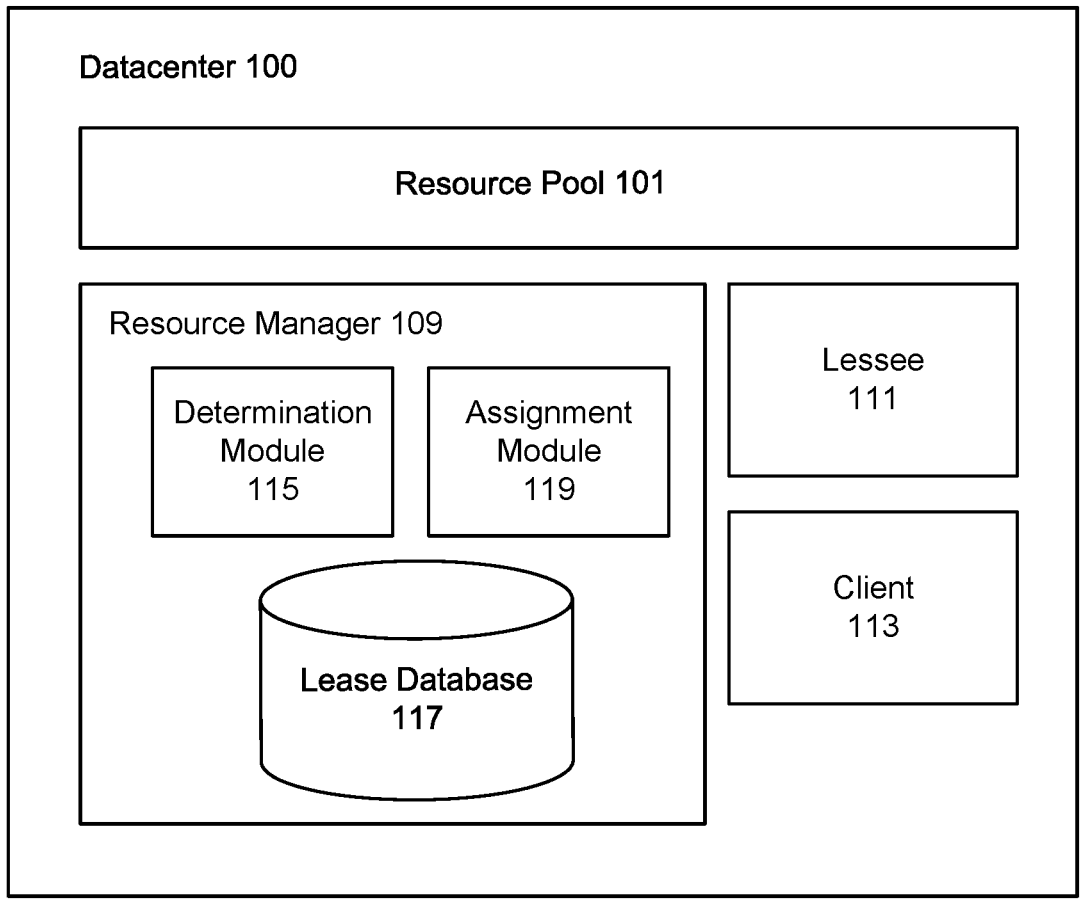
FIG. 1 illustrates a system architecture of a datacenter in accordance with one embodiment.

FIG. 1 illustrates a system architecture of a distributed computing system in accordance with one embodiment. An example of the distributed computing system is a datacenter 100 as shown in FIG. 1. As described below, it is convenient to have a resource manager that manages resources of the datacenter 100. The resource manager manages the resources of the datacenter 100 by assigning and renewing leases to the resources to lessees that are responsible for coordinating the resources amongst the different clients of the datacenter 100. However, lessees in the datacenter 100 may become unavailable due to device failure for example, thereby making the resources that are assigned to the lessees unavailable. Rather than allow a single lessee to compromise the datacenter 100 when the lessee becomes unavailable, the resource manager may manage the reassignment of the resource to another lessee in the datacenter 100.

The datacenter 100 also does not rely on sophisticated time synchronization systems or check and set operations for every client query to perform the embodiments described herein. Rather, each component of the datacenter 100 relies upon its own internal clock rather than a clock common to all the components of the datacenter to perform the embodiments. By having each component rely on its own internal clock, the datacenter 100 alleviates any issues caused by clock skew and network latency.

In one embodiment, the datacenter 100 includes a resource pool 101. The resource pool 101 includes different resources of the datacenter 100. In one embodiment, a resource is a process of the datacenter 100 that is associated with a particular computation carried out by the lessee 111 that is responsible for the resource. As described below, a lessee 111 that is responsible for a resource coordinates the availability of the resource amongst the different clients 113 of the datacenter 100 that require the resource. That is, clients of the datacenter 100 may request one or more resources from the resource pool 101 and a lessee responsible for the resources fulfills the request for the resources.

In one embodiment, the resources included in the resource pool 101 are application level resources that are typically always available with very short periods of unavailability (e.g., 30 second to 1 minute of unavailability). As an example, any computation that requires the coordination between a number (e.g., thousands) of clients 113 in the datacenter 100 can be considered a resource. The computation may be a calculation of the total sales of a company where the sales data is distributed across different clients 113 in the datacenter 100 for example. A lessee 111 that is responsible for the computation manages the resource by obtaining the sales data stored across the different clients 113 and calculating the total sales based on the obtained sales data responsive to the lessee 111 receiving a request for the total sales data from a client 113.

In another example, a resource may be a computation related to activity data transmitted by activity tracking devices produced by a company. The activity data is stored across different clients 113 of the datacenter 100 and may include different types of activity data such as gender data, age data, residence data, etc. In one embodiment, a single lessee 111 cannot be responsible for all the activity data as it is too much data for one lessee 111 to handle. Thus, a single lessee 111 may be responsible for performing calculations for a particular type of activity data. For example, a first lessee may be responsible for calculating the total number of males of a particular age (e.g., 34 years old) from the activity data (e.g., a first resource) and a second lessee may be responsible for calculating the total number of users that are California residents (e.g., a second resource) from the activity data.

In one embodiment, the datacenter 100 includes a resource manager 109, a lessee, 111, and a client 113. In one embodiment, the resource manager 109, lessee 111, and client 113 are in communication with each other via the Internet or any combination of a local area network (LAN), a metropolitan area network (MAN), a wide area network (WAN), a mobile, wired or wireless network, a private network, or a virtual private network. Although only a single resource manager 109, a single lessee 111, and a single client 113 are shown, the datacenter 100 can have any number of resource managers, lessees, and clients. Only a single resource manager 109, lessee 111, and client 113 are shown to ease the description of the embodiments herein.

In one embodiment, a lessee 111 is a machine (e.g., a server computer) in the datacenter 100 that comprises a lease on a resource from the resource pool 101. The lease on a resource grants the lessee 111 that holds the lease responsibility over the resource for a fixed duration of time. For example, the lease on a resource may specify the amount of time that is left on the lease (e.g., 2 minutes) rather than the specific time that the lease expires. In one embodiment, the length of the lease cannot be changed once the lease is issued to the lessee 111.

The lessee 111 may hold a plurality of leases on a plurality of different resources included in the resource pool 101. However, only a single lessee can hold a lease on a particular resource at any one point in time. That is, multiple lessees cannot simultaneously hold a lease on the same resource.

The lessee 111 monitors the remaining amount of time on the lease according to the lessee 111's own internal clock. By monitoring the remaining time on a lease with respect to the lessee 111's internal clock, the datacenter 100 obviates the need for the complicated synchronization mechanism used in conventional distributed systems thereby simplifying the datacenter 100. Prior to expiration of the lease, the lessee 111 may submit a renewal request to the resource manager 109 to renew the lease on the resource.

The lessee 111 will continue to be responsible for the resource if the resource manager 109 renews the lessee 111's lease on the resource. In one embodiment, the lessee 111 submits a request to renew a lease on a resource prior to the expiration of the lease. For example, the lessee 111 may submit a request to renew a lease halfway through the duration of time specified in the lease (e.g., after 1 minute if the lease is for 2 minutes). Alternatively, the lessee 111 may submit the request to renew a lease when the duration of time specified in the lease has elapsed. Note that a lease on a resource cannot be revoked once the lease is granted to a lessee 111. The lease on the resource can only expire and then subsequently be assigned to another lessee.

A lessee 111 that holds a lease on a resource receives requests for access to the resource from clients 113. The lessee 111 fulfills the requests for the resources during the duration of time that the lease on the resource is valid. That is, the lessee 111 is responsible for fulfilling requests for the resource while there is still time remaining in the lease for the resource. For example, a lessee 111 may hold a valid lease on a resource that calculates the total sales data for a particular company and the lessee 111 receives a request for the total sales data from a client 113. The lessee 111 may obtain the sales data from the different clients and calculate the total sales responsive to the request.

In one embodiment, a client 113 is a machine (e.g., a server computer) or process in the datacenter 100 that requires access to a resource from the resource pool 101. The client 113 communicates with the resource manager 109 to identify the lessee 111 that is the current lease holder of a desired resource. Prior to communicating the request to the resource manager 109, the client 113 may record the time of the request. Alternatively, the client 113 may record the time of the request after communicating with the resource manager 109.

After receiving information regarding the lessee 113 of the requested resource and the remaining time on the lease from the resource manager, the client 113 determines whether the lease on the resource is still valid. The client 113 determines the validity of the lease using the client 113's own internal clock. The client 113 may determine the difference between the current time and the time that the client submitted the request to identify the lessee. The client 113 compares the difference to the duration of time specified in the lease and if the client 1113 determines that the difference is less than the duration of time specified in the lease, the client 113 determines that the lease is still valid. Accordingly, the client 113 communicates with the identified lessee 111 to access the desired resource.

In one embodiment, clients periodically send acquisition requests to the resource manager 109 to become a lessee of one or more resources from the resource pool 101. That is, clients may poll the resource manager 109 to become a lessee of one or more resources in the resource pool 101. If a client 113 is granted a lease to a resource, the client 113 is now a lessee as well as a client. By having clients periodically poll (e.g., request) the resource manager 109 to acquire leases of resources, the datacenter 100 is ensured to always have lessees assigned to the resources from the resource pool 101 thereby minimizing downtime in the datacenter 100.

In one embodiment, an acquisition request sent by the client 113 to become a lessee includes an indication of the particular resource that the client is interested in obtaining a lease for, and the last known state of the resource. In one embodiment, the possible states of the resource may be "held" indicating that the resource is currently held by a lessee, "open" indicating that there is currently no lessee responsible for the resource, and "unknown" indicating that it's unclear whether there is a lessee responsible for the resource. The state of a resource may be unknown if the resource manager 109 determines that a lease for a resource is assigned to a lessee 111, but the lease has not been renewed. The state of a resource may also be unknown if the resource manager 109 experiences a network partition. In one embodiment, the acquisition request may also include an indication whether the client 113 would be willing to become the lease holder of the resource at a later time if a lease for the resource became available.

If the client's request to become a leaseholder is not granted, the client 113 may send periodic reminders to the resource manager 109 to remind the resource manager 109 that the client 113 is still interested in becoming the lease holder of a resource if the lease becomes available. The lease for the resource may eventually become available if the current lessee 111 of the resource does not renew the lease because the lessee 111 becomes unavailable due to device failure.

In one embodiment, sending an acquisition request comprises the client 113 recording the time of the acquisition request. The client 113 may record the current time and then sends an acquisition request to the resource manager 109. Alternatively, the client 113 records the current time after the acquisition request is sent to the resource manager 109. If the client 113 is granted a lease to a resource, the duration of the lease is calculated with respect to the time recorded by the client 113 that submitted the acquisition request.

In one embodiment, a resource manager 109 is a server computer or a process executing on the datacenter 100 that manages the resources in the resource pool 101. Although only a single resource manager 109 is shown in FIG. 1, the datacenter 100 may include multiple resource managers 109 that are in communication with each other to manage the resources in the resource pool 101. In one embodiment, management of resources includes assigning leases of resources in the resource pool 101 to clients of the datacenter 100, renewing leases assigned to lessees, and identifying the current lease holders of leases upon request from clients.

As shown in FIG. 1, the resource manager 109 includes a determination module 115, an assignment module 119, and a lessee database 117. In one embodiment, the resource manager 109 is implemented using the Paxos consensus protocol which is modified to implement the embodiments described herein. The functions can be distributed among the modules in a different manner than is described here. As used herein, the term "module" refers to computer program logic used to provide the specified functionality. Thus, a module can be implemented in hardware, firmware, and/or software.

The lease database 117 stores lease records of the leases assigned to lessees in the datacenter 100. Each lease record in the lease database 117 is associated with a specific resource and includes information specifying a lessee 111 that holds the lease associated with the lease record and the amount of time remaining on the lease. The information specifying the lessee 111 is an address of the lessee 111 such as the Inetaddress of the lessee 111 in one example. Each lease record may also specify the number of times that the lease for the resource was renewed by the lessee 111.

In one embodiment, the determination module 115 determines lessees that have leases on resources in the resource pool 101. The determination module 115 receives requests from the clients for the current lease holders of resources from the resource pool 101. In response to receiving a request for the current lease holder of a resource from client 113, the determination module 115 accesses the lease database 117 and identifies the record associated with the requested resource.

The determination module 115 determines the lessee 111 responsible for the resource and the amount of time remaining on the lease from the identified record. If the determination module 115 determines that there is still time remaining on the lease (i.e., the lease has not expired), the determination module 115 sends information about the lessee 111 that holds the lease on the resource (e.g., the Inetaddress of the lessee 111) and the amount of time remaining on the lease to the client 113 that submitted the request. As mentioned above, the client 113 determines the amount of time remaining on the lease with respect to the recorded time that the client 113 sent the request and the client's internal clock.

In one embodiment, the assignment module 119 assigns leases of resources to clients 113. The assignment module 119 may receive an acquisition request to become the lessee of a resource from client 113. The acquisition request may include the last known state of the resource that the client 113 is trying to acquire. The assignment module 119 records the current time that the acquisition request is received according to the resource manager 109's internal clock. The assignment module 119 then accesses the lease database 117 and identifies the record associated with the requested resource.

The assignment module 119 determines the current state of the lease on the requested resource from the identified record. If the assignment module 119 determines that the state of the lease is currently open (e.g., no lease holder) from the identified record, the assignment module 119 determines to grant the acquisition request. In one embodiment, the assignment module 119 may also communicate with other resource managers 109 in the datacenter 100 to determine if the state of the resource determined by the assignment module 119 matches the state of the resource determined by the other resource managers 109. If a consensus is reached between the different resource managers in the datacenter 100 that the state of the resource is currently open, the assignment module 119 grants the acquisition request.

If the assignment module 119 grants the request, the assignment module 119 updates the lease record with information about the client 113 that is now the lessee 111 for the resource (e.g., the Inetaddress of the lessee 111) and the duration of time that the lease is valid. The assignment module 119 tracks the amount of time remaining on the lease against the time the acquisition request was received by the assignment module 119 with respect the resource manager 109's internal clock. After the lease database 117 is updated, the assignment module 119 transmits the lease to the client 113 that submitted the acquisition request for the resource. The client 113 (now a lessee) tracks the amount of time remaining on the lease from the time the client 113 sent the acquisition request. If the assignment module 119 determines to deny the request, the assignment module 119 sends a notification to the client 113 denying the client's request for the lease of the requested resource.

In one embodiment, the assignment module 119 does not indicate to other clients that client 113 is now the lease holder of a resource until the client 113 has renewed the lease for the resource a threshold amount of times. For example, the client 113 must renew the lease at least once before the assignment module 119 reports that the client 113 is the lease holder of the resource. By having the client 113 renew the lease at least the threshold amount of times, the assignment module 119 confirms that the client 113 is committed to being responsible for the resource.

In one embodiment, the assignment module 119 renews leases on resources for lessees. The assignment module 119 receives renewal requests from lessees to renew leases on resources that the lessees are responsible for in the datacenter 100. Since leases for resources are only valid for a fixed amount of time, lessees regularly renew their leases if the lessees want to continue to be responsible for the resources. In one embodiment, the process for renewing a lease is similar to the process for assigning a lease.

The assignment module 119 receives a renewal request to renew a lease of a resource from the lessee 111 that currently holds the lease. The assignment module 119 records the time that the renewal request is received and determines whether to grant the renewal request. The assignment module 119 may determine that the lease has not been assigned to another lessee by accessing the lease record for the resource in the lease database 117 and/or communicating with the other resource managers 109 in the datacenter 100 to reach a consensus regarding the state of the resource.

If the assignment module 119 determines to renew the lease, the assignment module 119 updates the lease record in the lease database 117 with the duration of time that the lease is valid. The assignment module 119 may also update the lease record with the number of times that the lease has been renewed.

The assignment module 119 also begins tracking the amount of time remaining on the renewed lease against the time the renewal request was received by the assignment module 119 with respect the resource manager 109's internal clock. After the lease database 117 is updated, the assignment module 119 transmits the lease to the lessee 111 that submitted the lease renewal request. The lessee 111 tracks the amount of time remaining on the renewed lease from the time the client 113 sent the acquisition request according to the lessee's internal clock.

Figure 2:
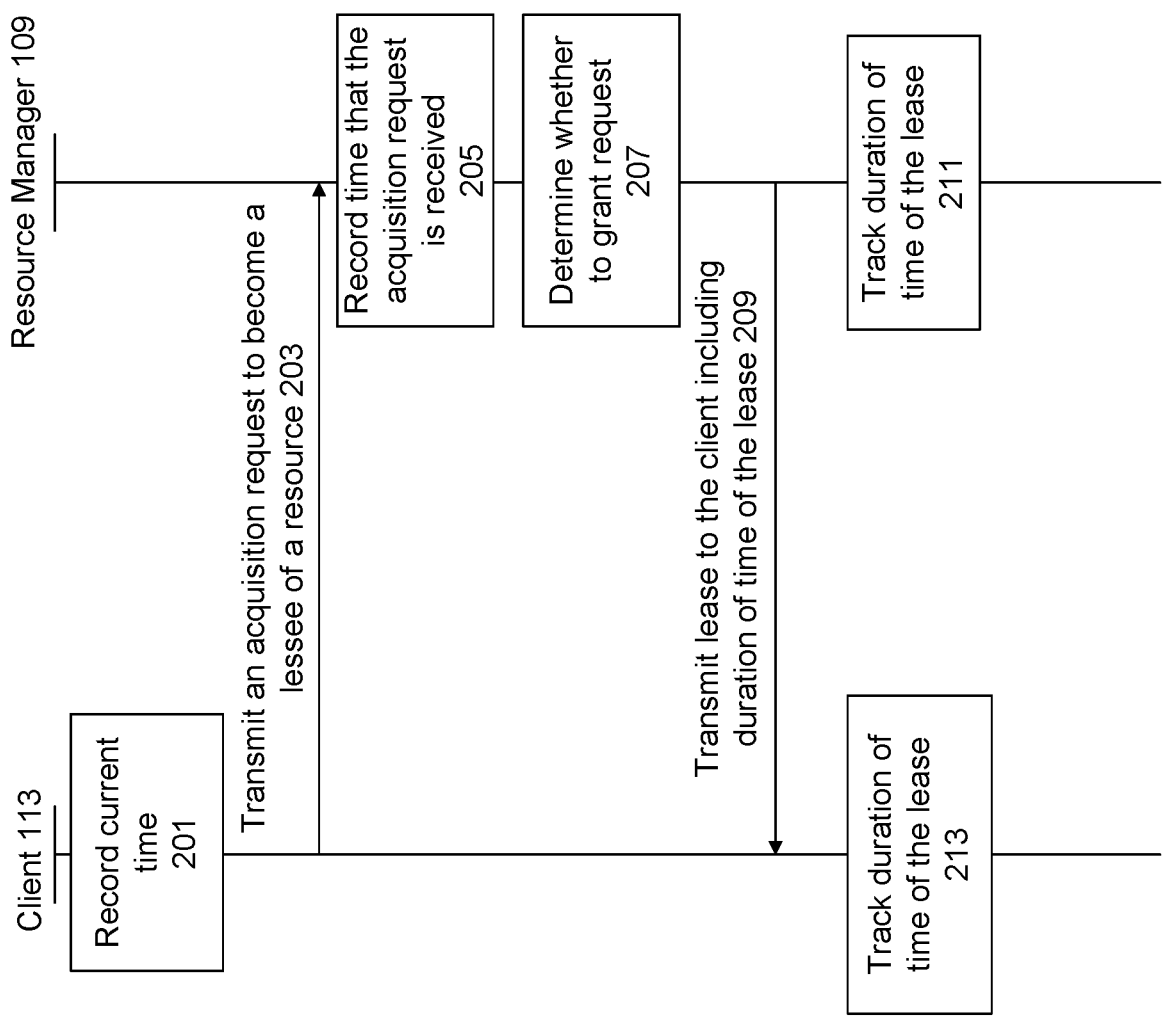
FIG. 2 is an interaction diagram illustrating a lease acquisition process according to one embodiment.

FIG. 2 illustrates one embodiment of an interaction diagram describing a lease acquisition process. Note that in other embodiments, steps other than those shown in FIG. 2 may be performed to assign a lease to a client.

In one embodiment, a client 113 records 201 the current time according to the client 113's internal clock and transmits 203 an acquisition request to the resource manager 109 to become a lessee of a resource. The acquisition request may also include the last known state of the lease of the resource that the client 113 is attempting to acquire.

The resource manager 109 records 205 the time that the acquisition request is received from the client 113. The resource manager 109 determines 207 whether to grant the acquisition request. In one embodiment, the resource manager 109 determines whether to grant the acquisition request by determining whether there is a current lease holder for the resource.

To determine if there is a current lease holder on the resource, the resource manager 109 accesses the lease database 117 to identify the lease record associated with the resource and determines the current state of the resource from the lease record. If the current state of the resource is "open" indicating that the resource does not have a lessee that is responsible for the resource, the resource manager 109 determines to grant the acquisition request. In one embodiment, the resource manager 109 may also communicate with other resource managers in the datacenter 100 to determine whether the state of the resource determined by the assignment module 119 matches the state of the resource determined by the other resource managers 109. If a consensus is reached between the different resource managers that the state of the resource is currently open, the resource manager 109 grants the acquisition request.

If the resource manager 109 grants the acquisition request, the resource manager 109 transmits 209 a lease to the client 113. The lease includes the duration of time that the lease is valid. The resource manager 109 tracks 211 the duration of time that the lease is valid with respect to the resource manager 109's internal clock and the time recorded by the resource manager 109 that is indicative of when the acquisition request was received by the resource manager 109. Similarly, the client 113 tracks the duration of time that the lease is valid with respect to the client 113's internal clock and the time recorded by the client 113 that is indicative of when the client 113 transmitted the acquisition request. The client 113 and the resource manager 109 each track the duration of time of the lease with respect to their own internal clock thereby obviating the need for any complicated synchronization systems. Any network latency in the datacenter 100 counts against the remaining lease duration so that the client 113 will always be at least as pessimistic as the resource manager 109 under the assumption that the network latency is greater than any differences in clock speed between the client 113 and the resource manager 109.

Figure 3:
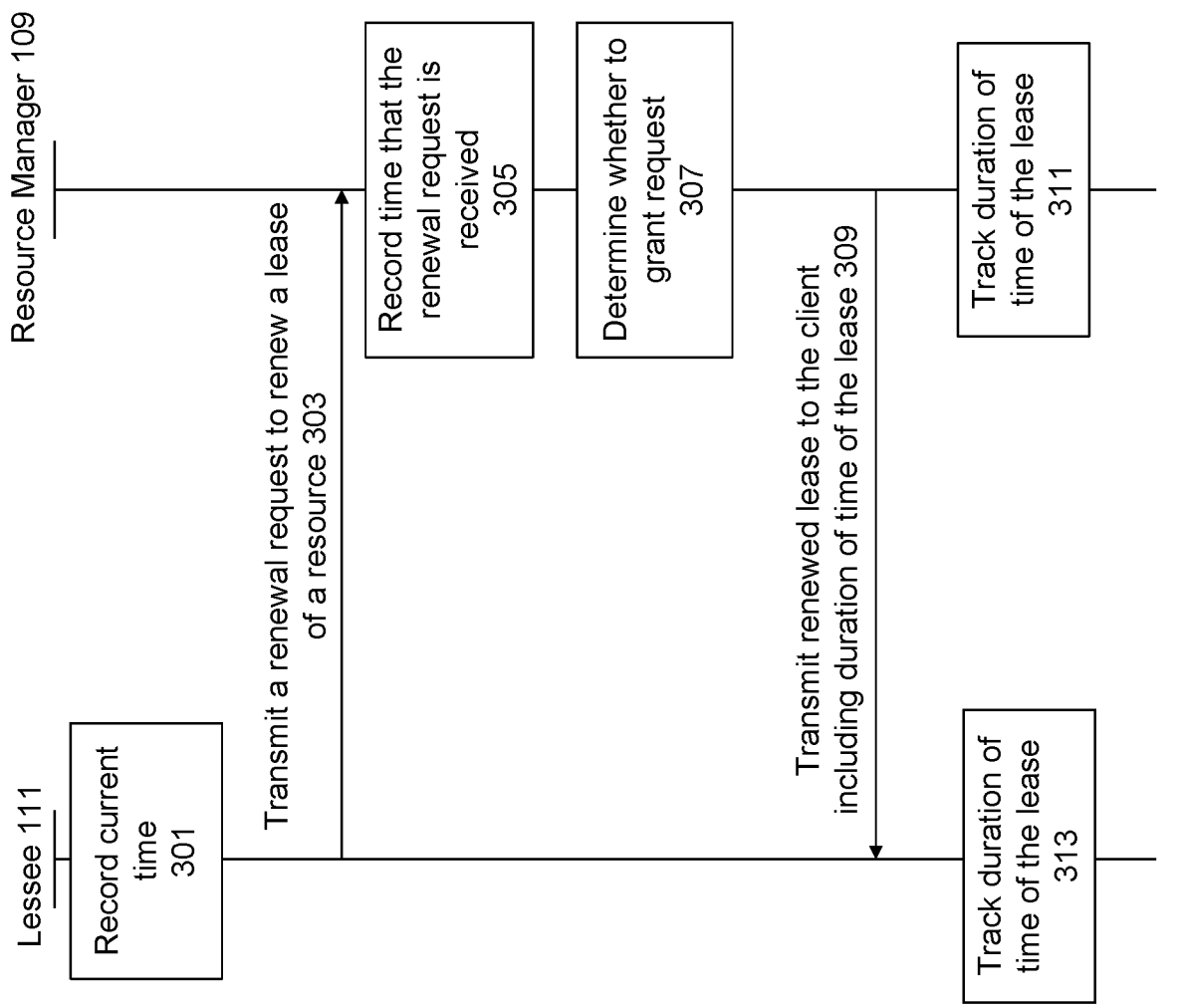
FIG. 3 is an interaction diagram illustrating a lease renewal process according to one embodiment.

FIG. 3 illustrates one embodiment of an interaction diagram describing a lease renewal process. Note that in other embodiments, steps other than those shown in FIG. 3 may be performed to renew a lease.

In one embodiment, a lessee 111 that currently holds a lease on a resource records 301 the current time according to the client 113's internal clock. The lessee 111 transmits 303 a renewal request to the resource manager 109 to renew the lease on the resource. In one embodiment, the lessee 111 transmits the renewal request prior to expiration of the lease on the resource such as halfway through the duration of the lease. Alternatively, the lessee 111 transmits the request after the lease has expired. The renewal request may also include the last known state of the lease of the resource that the lessee 111 is attempting to renew which would indicate that the lease is "held" by the lessee 111.

The resource manager 109 records 305 the time that the renewal request is received from the lessee 111 and determines 307 whether to grant the renewal request. In one embodiment, the resource manager 109 determines whether to grant the renewal request by confirming that the lessee 111 currently holds the lease for the resource. The resource manager 109 accesses the lease database 117 to identify the lease record associated with the resource and determines from the lease record that the state of the resource is currently "held" and that the lessee 111 is the current lease holder. If the current state of the resource matches the state included in the renewal request and that the lessee 111 is the current lease holder, the resource manager 109 determines to grant the renewal request. In one embodiment, the resource manager 109 may also communicate with other resource managers in the datacenter 100 to determine whether the state of the resource determined by the assignment module 119 matches the state of the resource determined by the other resource managers 109. If a consensus between the different resource managers is reached that the state of the resource is currently held by the lessee 111, the resource manager 109 determines to grant the acquisition request.

If the resource manager 109 grants the acquisition request, the resource manager 109 transmits 309 a renewed lease to the lessee 111. The renewed lease includes the duration of time that the renewed lease is valid. The resource manager 109 tracks 311 the duration of time that the renewed lease is valid with respect to the resource manager 109's internal clock and the time recorded by the resource manager 109 that is indicative of when the renewal request was received by the resource manager 109. Similarly, the lessee 111 tracks the duration of time that the renewed lease is valid with respect to the lessee 111's internal clock and the time recorded by the lessee 111 that is indicative of when the lessee 111 transmitted the renewal request. The lessee 111 and the resource manager 109 each track the duration of time with respect to their own internal clock thereby obviating the need for any complicated synchronization systems.

Figure 4:
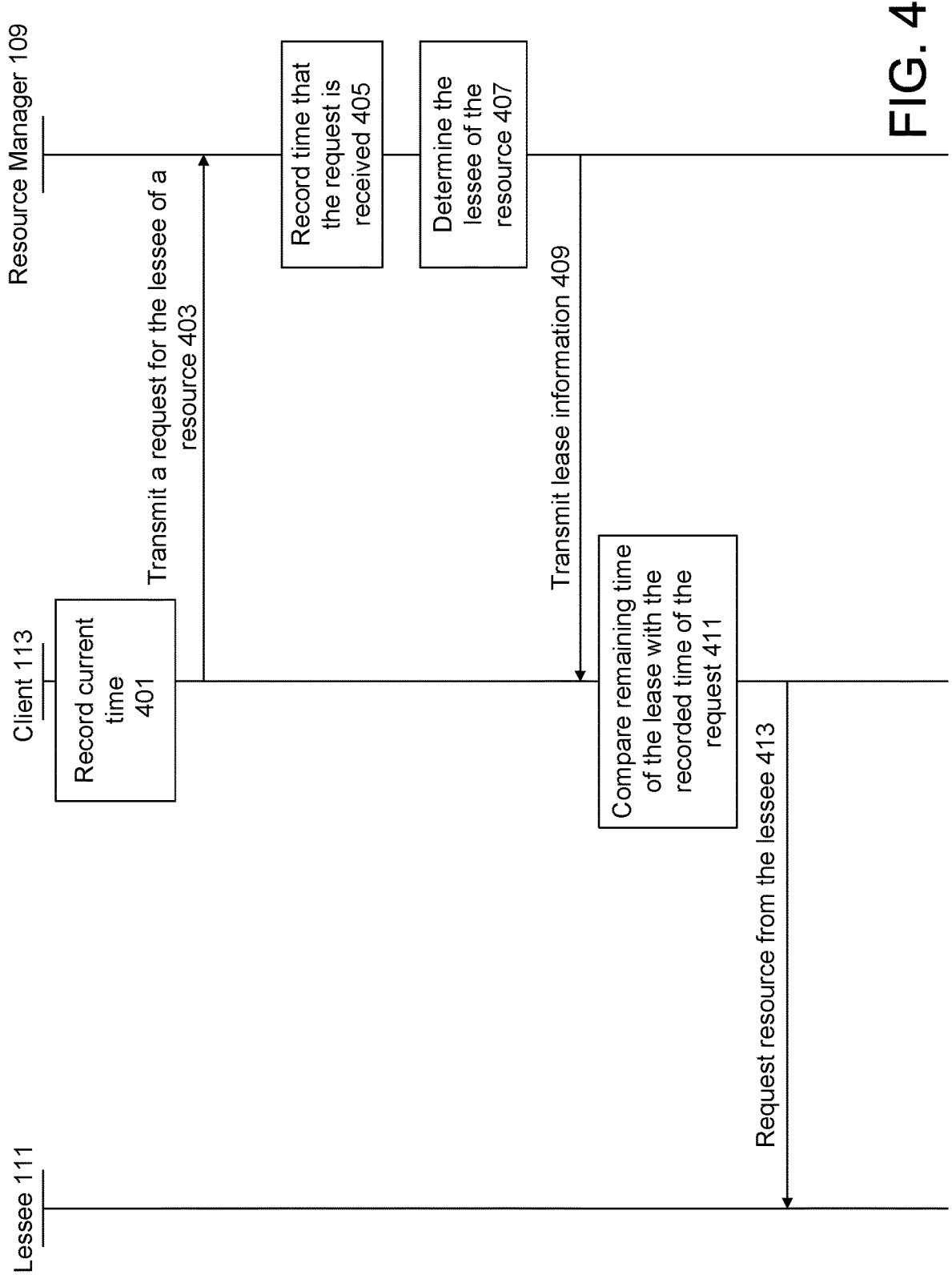
FIG. 4 is an interaction diagram illustrating a process for requesting a resource according to one embodiment.

FIG. 4 illustrates one embodiment of an interaction diagram describing a process of a client to gain access to a resource of the datacenter 100. Note that in other embodiments, steps other than those shown in FIG. 4 may be performed.

In one embodiment, the client 113 records 401 the current time and transmits 403 a request for the lessee of a desired resource to the resource manager 109. The resource manager 109 records 405 the time that the request is received from the client 113. The resource manager 109 determines 407 the lessee of the requested resource. The resource manager 109 determines the lessee of the requested resource by accessing the lease record associated with the resource from the lease database 117. The resource manager 109 determines 407 the current lessee of the resource and the amount of time remaining on the lease from the lease record.

After the lessee for the resource is identified, the resource manager 109 transmits 409 lease information to the client 113. The lease information includes information identifying the lessee 111 that holds the lease for the requested resource and the amount of time currently remaining on the lease. The client 113 compares the remaining time on the lease with the time recorded by the client 113. If the client 113 determines that the lease held by the lessee identified by the resource manager 109 is still valid based on the comparison, the client 113 requests 413 the resource from the lessee 111 and the lessee 111 fulfils the request.

Hardware Components

Figure 5:
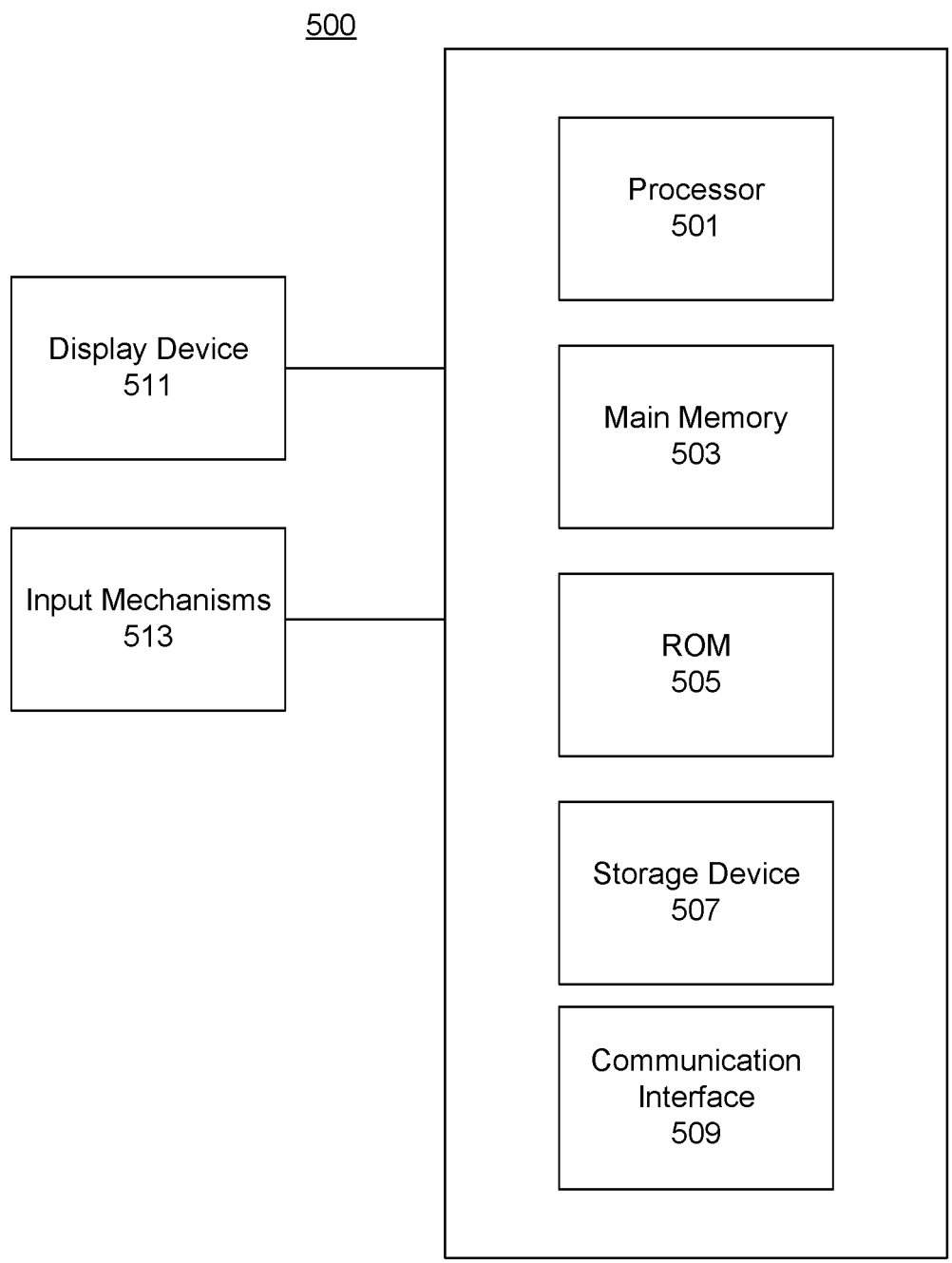
FIG. 5 illustrates a computer system that implements the embodiments herein according to one embodiment.

FIG. 5 is a diagram illustrating a server computer system 500 included in the datacenter 100 upon which embodiments described herein may be implemented. The datacenter 100 is implemented using a combination of multiple server computer systems as described by FIG. 5.

In one implementation, the server computer system 500 includes processing resources 501, main memory 503, read only memory (ROM) 505, storage device 507, and a communication interface 509. The server computer system 500 includes at least one processor 501 for processing information and a main memory 503, such as a random access memory (RAM) or other dynamic storage device, for storing information and instructions to be executed by the processor 501. Main memory 503 also may be used for storing temporary variables or other intermediate information during execution of instructions to be executed by processor 501. Server computer system 500 may also include ROM 505 or other static storage device for storing static information and instructions for processor 501. The storage device 507, such as a magnetic disk or optical disk, is provided for storing information and instructions.

The communication interface 509 can enable the server computer system 500 to communicate with one or more networks through use of the network link (wireless or wireline). Using the network link, the server computer system 500 can communicate with one or more computing devices, and one or more servers.

The server computer system 500 can also include a display device 511, such as a cathode ray tube (CRT), an LCD monitor, or a television set, for example, for displaying graphics and information to a user. An input mechanism 513, such as a keyboard that includes alphanumeric keys and other keys, can be coupled to the server computer system 500 for communicating information and command selections to processor 501. Other non-limiting, illustrative examples of input mechanisms 513 include a mouse, a trackball, touch-sensitive screen, or cursor direction keys for communicating direction information and command selections to processor 501 and for controlling cursor movement on display device 911.

Examples described herein are related to the use of the server computer system 500 in the datacenter 100 for implementing the techniques described herein. According to one embodiment, those techniques are performed by the datacenter 100 in response to processor 501 executing one or more sequences of one or more instructions contained in main memory 503. Such instructions may be read into main memory 503 from another machine-readable medium, such as storage device 507. Execution of the sequences of instructions contained in main memory 503 causes processor 501 to perform the process steps described herein. In alternative implementations, hard-wired circuitry may be used in place of or in combination with software instructions to implement examples described herein. Thus, the examples described are not limited to any specific combination of hardware circuitry and software.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

We claim:

1. A computer-implemented method for managing leases of resources of a datacenter, the method comprising:
   receiving, by a resource manager of a datacenter, an acquisition request from a client in the datacenter to become a lessee of a resource of the datacenter;
   communicating with one or more other resource managers in the datacenter to determine whether the resource is currently assigned to another lessee of the datacenter responsive to the acquisition request;
   responsive to the one or more other resource managers reaching a consensus that a lease to the resource is not currently assigned to another lessee, granting the lease on the resource to the client that submitted the acquisition request;
   transmitting a lease for the resource to the client responsive to the resource manager granting the acquisition request, the lease including a remaining duration of time that the lease on the resource is valid; and
   tracking, by the resource manager, the remaining duration of time that the lease on the resource is valid with respect to an internal clock of the resource manager; and
   wherein the client tracks the duration of time that the lease on the resource is valid with respect to an internal clock of the client that is distinct from the internal clock of the resource manager.

2. The computer-implemented method of claim 1, further comprising:
   recording a time that the acquisition request is received from the client; and
   wherein the remaining duration of time is tracked by the resource manager with respect to the recorded time that the acquisition request was received from the client.

3. The computer-implemented method of clam 1, further comprising:
   determining whether a lease to the resource is currently assigned to another lessee of the datacenter; and
   responsive to determining that a lease to the resource is not currently assigned to another lessee, communicating with one or more other resource managers.

4. The computer-implemented method of claim 3, further comprising:
   responsive to at least one other resource manager indicating that a lease to the resource is currently assigned to another lessee, denying the lease on the resource to the client that submitted the acquisition request.

5. The computer-implemented method of claim 1, further comprising:
   periodically receiving acquisition requests from clients of the datacenter to become lessees of resources of the datacenter; and
   evaluating each of the acquisition requests to determine which clients are granted a lease to the requested resources.

6. The computer-implemented method of claim 1, further comprising:
   receiving, by the resource manager, a renewal request from the client to renew the lease on the resource;
   recording a time that that the resource manager received the renewal request from the client to renew the lease on the resource;
   responsive to determining to renew the lease, transmitting a renewed lease to the client, the renewed lease including a remaining duration of time that the renewed lease on the resource is valid; and
   tracking, by the resource manager, the remaining duration of time that the renewed lease on the resource is valid with respect to the internal clock of the resource manager and the time that the resource manager received the renewal request;
   wherein the client device tracks the duration of time that the renewed lease on the resource is valid with respect to the internal clock of the client and a time that the client sent the renewal request.

7. The computer-implemented method of claim 6, wherein the resource manager receives the renewal request from the client prior to the duration of the time on the lease expiring.

8. The computer-implemented method of claim 7, wherein the resource manager receives the renewal request from the client halfway through the duration of time on the lease.

9. The computer-implemented method of claim 1, further comprising:
monitoring, by the resource manager, an amount of times that the client's lease of the resource was renewed by the client; and
responsive to the amount of times exceeding a threshold, reporting the client as the lessee of the resource to another client; and
responsive to the amount of times being below the threshold, refraining from reporting the client as the lessee of the resource to the other client.

10. The computer-implemented method of claim 1, wherein the lease grants the client control over the resource for remaining duration of time that the lease on the resource is valid.

11. A datacenter for managing leases of resources of a datacenter, the computer system comprising:
a plurality of clients including a first client;
a resource pool including a plurality of resources of the datacenter;
one or more computer processors; and
a non-transitory computer readable storage medium storing executable code, the code when executed by the one or more computer processors causes the one or more computer processors to perform steps comprising:
receiving, by a resource manager of the datacenter, an acquisition request from the first client in the datacenter to become a lessee of a resource from the plurality of resources of the datacenter;
communicating with one or more other resource managers in the datacenter to determine whether the resource is currently assigned to another lessee of the datacenter responsive to the acquisition request;
responsive to the one or more other resource managers reaching a consensus that a lease to the resource is not currently assigned to another lessee, granting the lease on the resource to the first client that submitted the acquisition request;
transmitting a lease for the resource to the first client responsive to the resource manager granting the acquisition request, the lease including a remaining duration of time that the lease on the resource is valid; and
tracking, by the resource manager, the remaining duration of time that the lease on the resource is valid with respect to an internal clock of the resource manager; and
wherein the first client tracks the duration of time that the lease on the resource is valid with respect to an internal clock of the client that is distinct from the internal clock of the resource manager.

12. The datacenter of claim 11, wherein the code when executed by the one or more computer processors further causes the one or more computer processors to perform steps comprising:
recording a time that the acquisition request is received from the client; and
wherein the remaining duration of time is tracked by the resource manager with respect to the recorded time that the acquisition request was received from the client.

13. The datacenter of claim 11, wherein the code when executed by the one or more computer processors further causes the one or more computer processors to perform steps comprising:
determining whether a lease to the resource is currently assigned to another lessee of the datacenter; and
responsive to determining that a lease to the resource is not currently assigned to another lessee, communicating with one or more other resource managers.

14. The datacenter of claim 13, wherein the code when executed by the one or more computer processors further causes the one or more computer processors to perform steps comprising:
responsive to at least one other resource manager indicating that a lease to the resource is currently assigned to another lessee, denying the lease on the resource to the client that submitted the acquisition request.

15. The datacenter of claim 11, wherein the code when executed by the one or more computer processors further causes the one or more computer processors to perform steps comprising:
periodically receiving acquisition requests from clients of the datacenter to become lessees of resources of the datacenter; and
evaluating each of the acquisition requests to determine which clients are granted a lease to the requested resources.

16. The datacenter of claim 11, wherein the code when executed by the one or more computer processors further causes the one or more computer processors to perform steps comprising:
receiving, by the resource manager, a renewal request from the client to renew the lease on the resource;
recording a time that that the resource manager received the renewal request from the client to renew the lease on the resource;
responsive to determining to renew the lease, transmitting a renewed lease to the client, the renewed lease including a remaining duration of time that the renewed lease on the resource is valid; and
tracking, by the resource manager, the remaining duration of time that the renewed lease on the resource is valid with respect to the internal clock of the resource manager and the time that the resource manager received the renewal request;
wherein the client device tracks the duration of time that the renewed lease on the resource is valid with respect to the internal clock of the client and a time that the client sent the renewal request.

17. The datacenter of claim 16, wherein the resource manager receives the renewal request from the client prior to the duration of the time on the lease expiring.

18. The datacenter of claim 17, wherein the resource manager receives the renewal request from the client halfway through the duration of time on the lease.

19. The datacenter of claim 11, wherein the code when executed by the one or more computer processors further causes the one or more computer processors to perform steps comprising:
monitoring, by the resource manager, an amount of times that the client's lease of the resource was renewed by the client; and
responsive to the amount of times exceeding a threshold, reporting the client as the lessee of the resource to another client; and responsive to the amount of times being below the threshold, refraining from reporting the client as the lessee of the resource to the other client.

20. The datacenter of claim 11, wherein the lease grants the client control over the resource for remaining duration of time that the lease on the resource is valid.

* * * * *

UNITED STATES PATENT AND TRADEMARK OFFICE
CERTIFICATE OF CORRECTION

PATENT NO. : 10,931,752 B2
APPLICATION NO. : 16/143218
DATED : February 23, 2021
INVENTOR(S) : Eggleston et al.

Page 1 of 1

It is certified that error appears in the above-identified patent and that said Letters Patent is hereby corrected as shown below:

In the Claims

In Column 12, in Claim 3, Line 23, delete "of clam" and insert -- of claim --, therefor.

In Column 12, in Claim 6, Line 48, delete "that that" and insert -- that --, therefor.

In Column 14, in Claim 16, Line 36, delete "that that" and insert -- that --, therefor.

Signed and Sealed this
Third Day of August, 2021

Drew Hirshfeld
*Performing the Functions and Duties of the
Under Secretary of Commerce for Intellectual Property and
Director of the United States Patent and Trademark Office*